US010732150B2

(12) United States Patent
Flanagan

(10) Patent No.: US 10,732,150 B2
(45) Date of Patent: Aug. 4, 2020

(54) SENSOR HAVING MAGNETIC BOUNDARY SEAL

(71) Applicant: Windrock, Inc., Knoxville, TN (US)

(72) Inventor: Edward Flanagan, Knoxville, TN (US)

(*) Notice: Subject to any disclaimer, the term of this patent is extended or adjusted under 35 U.S.C. 154(b) by 0 days.

(21) Appl. No.: 15/697,487

(22) Filed: Sep. 7, 2017

(65) Prior Publication Data

US 2019/0072525 A1  Mar. 7, 2019

(51) Int. Cl.

| *G01N 29/24* | (2006.01) |
| *G01N 29/265* | (2006.01) |
| *G01N 17/04* | (2006.01) |
| *G10K 11/35* | (2006.01) |
| *G01N 29/14* | (2006.01) |
| *G01S 7/52* | (2006.01) |
| *G01H 3/00* | (2006.01) |
| *G01N 29/32* | (2006.01) |

(52) U.S. Cl.
CPC .......... *G01N 29/2456* (2013.01); *G01H 3/00* (2013.01); *G01N 17/04* (2013.01); *G01N 29/14* (2013.01); *G01N 29/2412* (2013.01); *G01N 29/265* (2013.01); *G01N 29/32* (2013.01); *G01S 7/52063* (2013.01); *G10K 11/355* (2013.01)

(58) Field of Classification Search
CPC ..... G01N 29/2456; G01N 29/14; G01N 17/04
USPC ............................ 73/649, 644, 587, 660, 617
See application file for complete search history.

(56) References Cited

U.S. PATENT DOCUMENTS

| 3,735,456 | A | | 5/1973 | Cude | |
| 4,771,637 | A | | 9/1988 | Kubler | |
| 5,454,269 | A | * | 10/1995 | Vogt | G01N 29/28 |
| | | | | | 310/336 |
| 6,435,902 | B1 | * | 8/2002 | Groh | G01H 1/003 |
| | | | | | 439/527 |
| 6,578,682 | B2 | | 6/2003 | Braman et al. | |
| 6,598,479 | B1 | | 7/2003 | Robinson et al. | |
| 6,805,358 | B2 | | 10/2004 | Dawson et al. | |
| 6,892,581 | B2 | | 5/2005 | Robinson et al. | |
| 6,957,564 | B2 | | 10/2005 | Nelson et al. | |
| 7,320,249 | B2 | * | 1/2008 | Georgeson | G01N 29/24 |
| | | | | | 73/634 |
| 9,188,479 | B2 | | 11/2015 | Richer | |
| 9,556,927 | B2 | | 1/2017 | Smith | |
| 9,874,842 | B2 | * | 1/2018 | Ishida | G03G 15/5029 |
| 2008/0307637 | A1 | * | 12/2008 | Fogarty | G01D 11/245 |
| | | | | | 29/729 |
| 2009/0095082 | A1 | | 4/2009 | Komninos | |

(Continued)

*Primary Examiner* — Nimeshkumar D Patel
*Assistant Examiner* — Jean F Morello
(74) *Attorney, Agent, or Firm* — Matthew M. Googe; Robinson IP Law, PLLC

(57) ABSTRACT

A sensor device includes: a probe body having a first end and a second end, the probe body defining a probe cavity within the probe body; a sensor located at the first end of the probe body, the sensor having a sensor surface in sensory communication with the probe cavity defined within the probe body; a permanent magnet located adjacent the second end of the probe body and at least partially circumscribing the probe cavity defined within the probe body; an isolating boundary portion located between the permanent magnet and a surface of the object of interest and having a passage formed therethrough, the passage in communication with the probe cavity defined within the probe body.

19 Claims, 7 Drawing Sheets

(56) References Cited

U.S. PATENT DOCUMENTS

2009/0310808 A1* 12/2009 Button .................. H04R 1/24
                                                                             381/339
2011/0079084 A1    4/2011  Zusman et al.

* cited by examiner

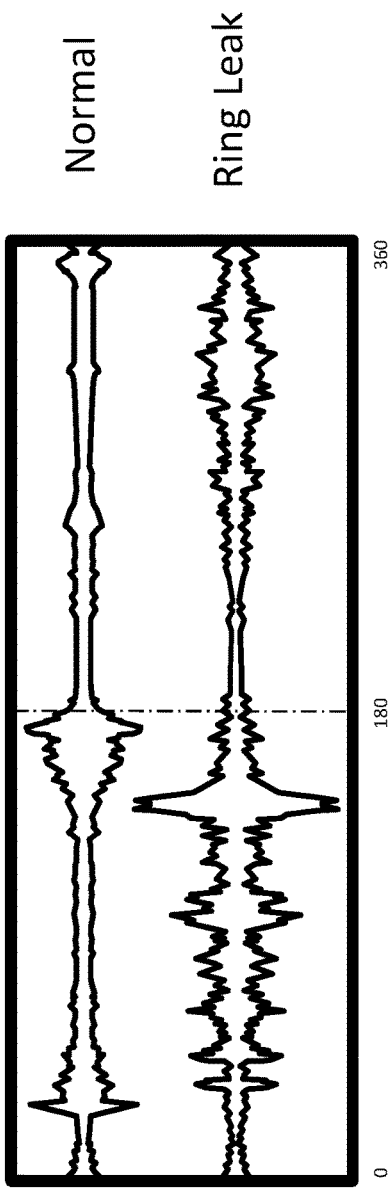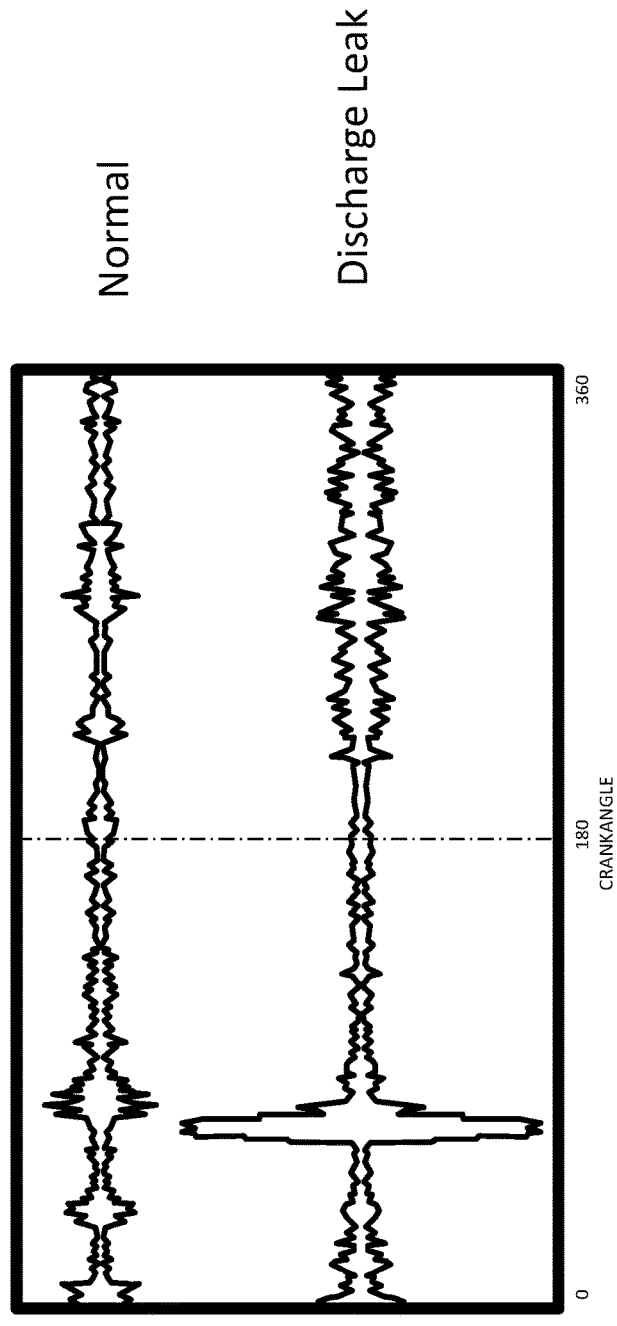

SENSOR HAVING MAGNETIC BOUNDARY SEAL

FIELD

This disclosure relates to the field of sensors. More particularly, this disclosure relates to a sensor removably attached to an object of interest that improves signal to noise ratio.

BACKGROUND

A variety of sensors exist for monitoring the operation of machinery. These sensors are commonly employed as part of a maintenance program to detect signals corresponding to operation of the machinery for further analysis. For example, sensors are commonly used to detect vibrations emitted by the machinery during operation for further analysis to detect a potential anomaly. Common vibration sensors may employ accelerometers to measure acceleration in sonic frequency ranges for analysis of commonly experienced machine dynamics, or to measure acceleration in ultrasonic frequency ranges for analysis of stress waves, leaks, friction and the like to examine evidence of normal or abnormal events in equipment and machinery that initiate such high frequency vibration signals. For example ultrasonic measurements are commonly used to detect evidence of compressor valve leaks, compressed air leaks and steam trap and valve leaks, air infiltration, electrical emissions, pneumatic operation, actuator operation, pressure and vacuum leak detection (tubes in boilers, heat exchangers, condensers, chillers, distillation columns, vacuum furnaces, specialty gas systems), hydraulic valve bypass, steam trap or other valve testing (leaking or clogged), reciprocating machinery valve blow-by monitoring, compressor valve analysis, pump cavitation monitoring, bearing testing/trending (such as for motors, pumps), gear and gear box inspection, general mechanical inspection, tanks and pipe system testing (integrity of seals and gaskets), cockpit window leaks, wind noise and water leak detection, hatch/marine leak inspection, electrical inspection (anomalies in switchgear), crusher and screen monitoring, flow/no flow/solid flow detection, electrical (arcing/tracking/corona), bearing lubrication failure (fatigue failure, flooding of or lack of lubricant).

Of particular interest is an application of ultrasonic acceleration measurement of fluidborne vibration signals projected from a circumscribed area selected on a gas compressor valve cover. The interest is to observe ultrasonic frequency vibrations indicative of a valve operation, a valve discharge leakage, a valve suction leakage, a ring leakage, a plugging, a worn rider mechanism, other mechanical defects, as well as normal operations of mechanisms and of processes as those skilled in the art are able to understand and interpret from ultrasonic signals produced by fluidborne sensors engaged in sensory contact with the selected circumscribed area. State of the art for measuring and interpreting such measurements is summarized in "Monitoring Reciprocating Compressors 0915", presented to the Vibration Institute Piedmont Chapter, Sep. 18, 2015 by Mary Chapman, Windrock, a Dover Corporation. A state of the art sensor device reported therein is pictured on slide titled, "UltraSonics to Identify Mechanical Defects" and this sensor device is lacks removable attachment and must be held in place with hand held force. Typical sensors are permanently or semi-permanently attached to a surface of the machinery to detect vibrations in the machinery. These sensors require installation of the sensor on the machinery, such as using a threaded fastener attached to a surface of the machinery. Such installation limits placement of the sensor and requires modification of the outer surface of the machinery to accept installation of the sensor, such as by installing a mounting base on a surface of the machinery. While some sensors allow for detection of vibration of a piece of machinery by contact, such sensors may reduce an effectiveness of the sensor in detecting vibrations and result in increased noise relative to desired signals detected by the sensor.

Magnet mount sonic or ultrasonic frequency range accelerometer sensors are commonly used for removable attachment to ferromagnetic machines. For example, the Model RS1 available from SDT (sdtultrasound.com/products-solutions/solutions/valve-condition-monitoring) threaded ultrasonic sensor with magnetic attachment mounts directly on an object such as a valve cover for hands-free testing. These magnet mount acceleration sensors in the art are responsive primarily to vibrations passed through metal members that provide a connected vibration signal path from a machine surface to sensor detector surface. A complaint often raised with reference to magnet mount sensors from the art has been unwanted signal losses component-to-component linkages. To address that complaint Robinson in U.S. Pat. Nos. 6,435,902 and 6,598,479 teaches an integral magnet mounting configuration. These removable attachment techniques from the art are useful for receiving mechanically transmitted vibrations from a ferromagnetic surface with little discrimination; they are not insulated or isolated from unwanted ambient vibration signals, whether structure borne or fluidborne (gas fluid or liquid fluid).

What is needed, therefore, is a sensor device having a detector of fluidborne vibrations within a probe cavity, a removable hands-free attachment for connecting the freestanding sensor device to a vibrating surface of interest, an isolation boundary surrounding the probe cavity including the detector and sealing an area of interest to the vibrating surface of interest, and a fluidborne vibration coupling medium within the probe cavity for transmitting vibrations or interest from the vibrating surface.

SUMMARY

The above and other needs are met by a sensor removably attachable to an object of interest. In a first aspect, a sensor device for being removably attached to a ferromagnetic surface of an object of interest, the sensor device includes: a probe body having a first end supporting a sensor and a second end for being removably attached to the ferromagnetic surface, the probe body defining a probe cavity containing a vibration coupling fluid medium within the probe body; a sensor located at the first end of the probe body, isolated from unwanted mechanical vibrations originating from the ferromagnetic surface and isolated from unwanted fluidborne vibrations originating from the environment around the probe body when the probe body is attached to the ferromagnetic surface; a permanent magnet located adjacent the second end of the probe body and at least partially circumscribing one of the probe body and probe cavity; a sealing boundary portion located between the permanent magnet and a surface of the object of interest and in communication with the probe cavity defined within the probe body. The sealing boundary portion is compressibly sealed by the magnet's force against the ferromagnetic surface and wherein the coupling medium transmits fluidborne vibration signals from the vibrating object of interest having the ferromagnetic surface at the second end of the sensor device for the sensor to detect coupled vibrations at first end of the sensor device.

In one embodiment, the sensor comprises an ultrasound sensor located at or within the probe cavity defined within the probe body. In another embodiment, the permanent magnet is tubular in shape including a passage formed therethrough, the probe cavity further comprising the passage formed through the permanent magnet. In yet another embodiment, the tubular permanent magnet fully circumscribes the probe body and cavity defined therein.

In one embodiment, the isolating boundary portion is formed of an elastomeric material.

In another embodiment, the sensor is fully enclosed within the probe body. In yet another embodiment, a wall of the cavity is formed from a rubber material for further isolating external vibrations from the cavity.

In one embodiment, the isolating boundary portion is formed into a ring having an open inner portion having a shape corresponding to a shape of the cavity formed within the probe body.

In another embodiment, the permanent magnet has an open inner portion that is located around an outer surface of the probe body, and wherein the probe body extends through the permanent magnet to a point adjacent a bottom surface of the permanent magnet.

In yet another embodiment, an inner wall of the probe body defining the probe cavity is aligned with the passage of the isolating boundary portion such that a cavity having a consistent width is formed along a length of the cavity.

In one embodiment, the isolating boundary portion is fixed to a bottom surface of the magnet such that the isolating boundary surface is located between the magnet and the surface of the object of interest.

In another embodiment, the probe body includes an elongate cylindrical tube extending through the magnet, wherein the isolating boundary portion comprises a portion of the cylindrical tube that extends beyond the magnet to the surface.

In yet another embodiment, the sensor device further includes a divider located within the probe cavity for forming a plurality of channels within the probe cavity. In one embodiment, the channels are formed as quadrants within the probe cavity. In another embodiment, the divider is a tube creating concentric channels within the probe cavity.

In a second aspect, a sensor device is provided for being removably attached to an object of interest, the sensor device including: a probe body having a first end and a second end, the probe body defining a cylindrical probe cavity within the probe body; an ultrasonic sensor located at the first end of the probe body, the sensor having a sensor surface in sensory communication with the probe cavity defined within the probe body; a permanent magnet located adjacent the second end of the probe body and at least partially circumscribing the probe cavity defined within the probe body; an elastomeric isolating boundary portion located between the permanent magnet and a surface of the object of interest and having a passage formed therethrough, the passage in communication with the probe cavity defined within the probe body. The elastomeric isolating boundary portion is compressible between the permanent magnet and the surface of the object of interest when the sensor module is attached to the object of interest to at least partially isolate vibrations of the object of interest from the sensor module.

In a third aspect, an ultrasonic sensor device is provided for being removably attached to an ultrasonically vibrating surface of an object of interest, the device including: a probe body, a sensor, and a secure attachment mechanism. The probe body includes the secure attachment mechanism to secure and allow removal of the probe body from a portion of an object of interest, and the sensor having a detector and electrical output and including an ultrasonic vibration sensing surface responsive to vibration energy fluid coupled through the medium, and an electrical output signal derived from ultrasonic vibration energy detected by the sensing surface. The secure attachment mechanism provides for removable attachment of a free standing probe body. Secure attachment is at least sufficient to overcome gravitational acceleration for a probe body attached to a vertical surface. The device with the probe body is attached to the vibrating surface further comprises a confinement boundary, a structure, a material, and an exclusion boundary. The confinement boundary of the probe body comprises a volume of fluid medium for coupling ultrasonic vibrations from a surface of interest to the sensor surface, the structure of the probe body stations the sensor surface near a first end of the confined volume, the material of the probe body attenuates mechanically transmitted ultrasonic vibrations, and the exclusion boundaries of the probe body attenuate external vibratory noise.

In one embodiment, the attachment mechanism is a permanent magnet, wherein the attenuating material is an elastomer, and where the coupling medium is selected from the group consisting of air, gas, and water.

In another embodiment, the object of interest is a valve cover for a gas compressor and where the ultrasonic vibrations further comprise a characteristic pattern which may deductively associated with a recognizable pattern from the group consisting of recognizable patterns including: an intake, and exhaust, an open condition, a closed condition, a timing, an impact, an operation, a start, an on line, and an off line.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIGS. 9A-9C are examples showing ultrasonic signal waveforms comparing normal operation and processing with abnormal conditions.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

A sensor device is provided that is in sensory contact with a surface of a piece of machinery for improved capturing of a signal corresponding to vibrations of the machinery by the sensor device. The sensor device advantageously enables mounting and sealing of the sensor device to a surface of interest. The sensor device is removably mounted on the surface of interest such that the sensor device is readily movable from one portion of a surface of interest to another.

Figure 1:
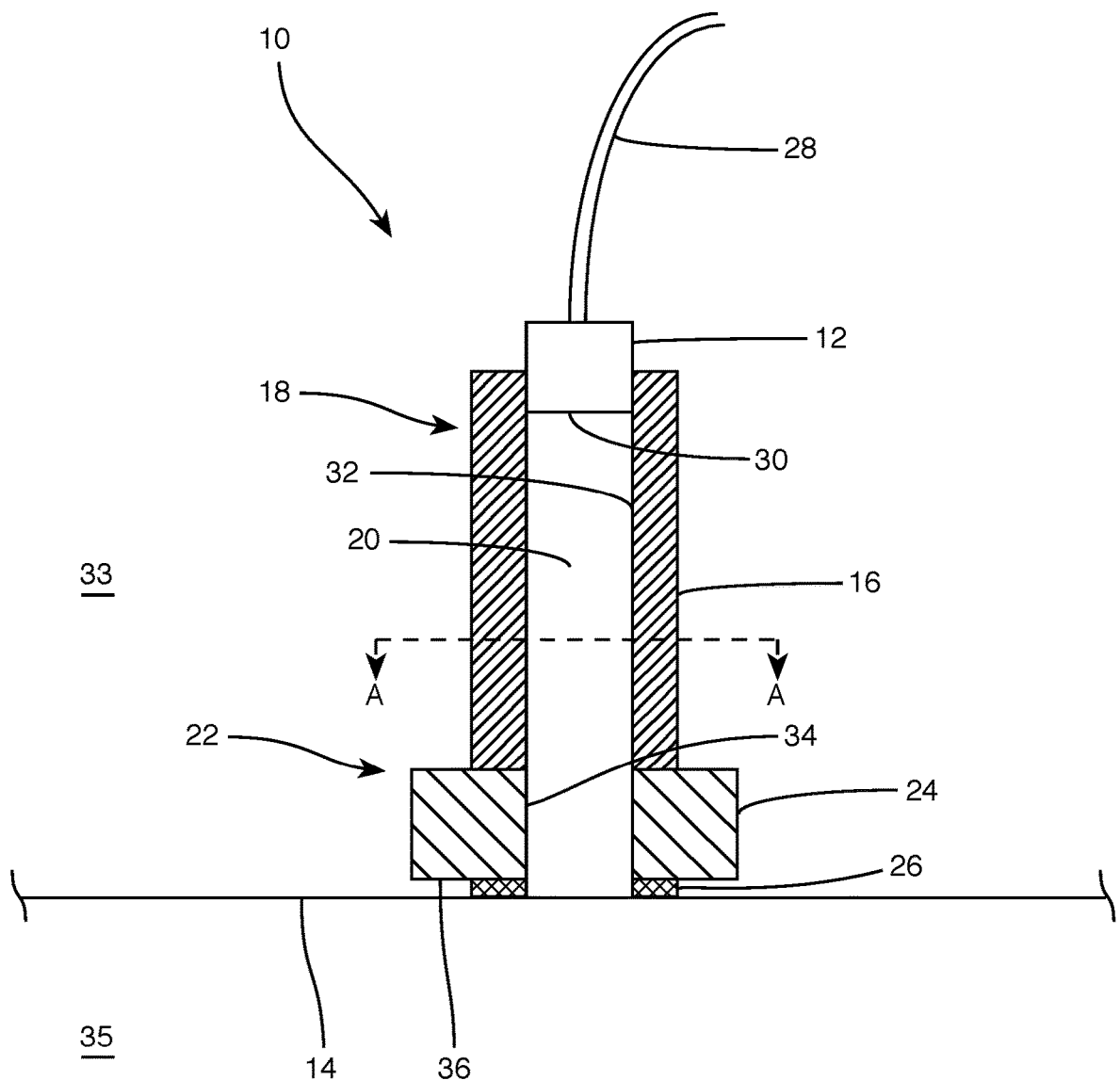
FIG. 1 shows a cross-sectional side view of a sensor device according to one embodiment of the present disclosure.
Figure 2:
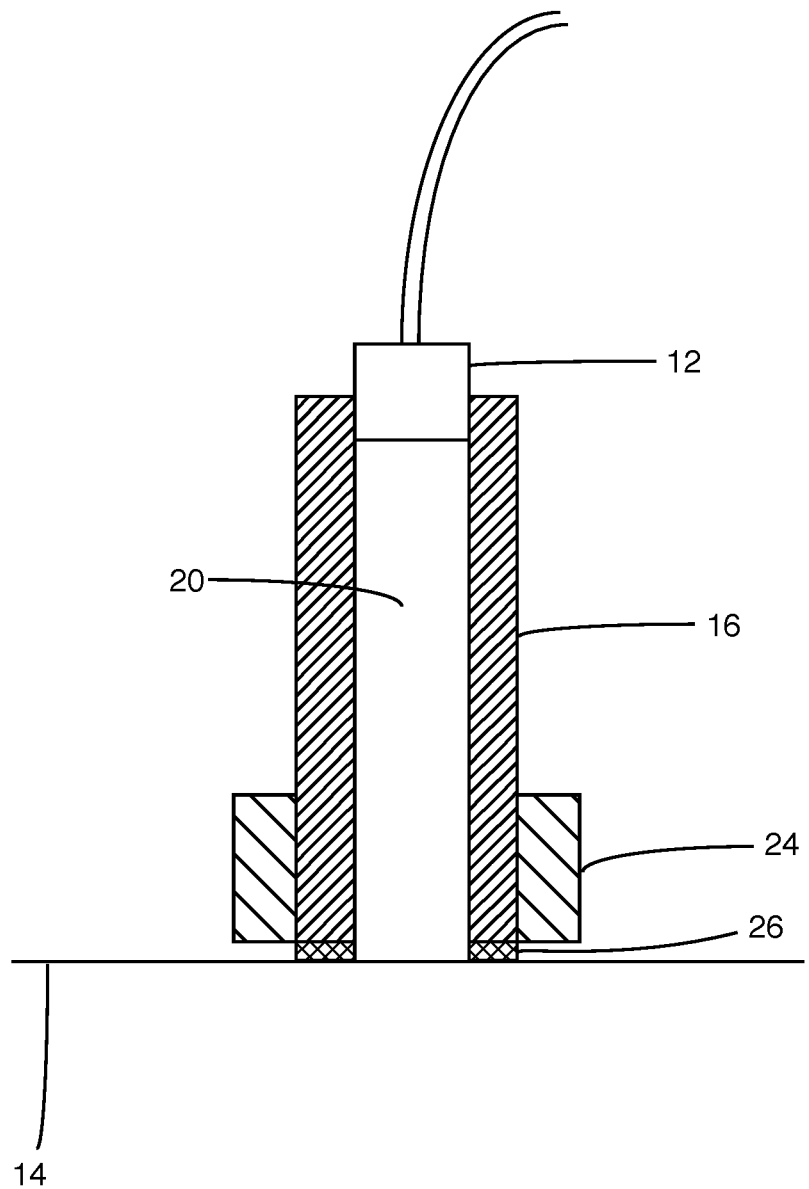
FIG. 2 shows a cross-sectional side view of a sensor device according to one embodiment of the present disclosure.
Figure 5:
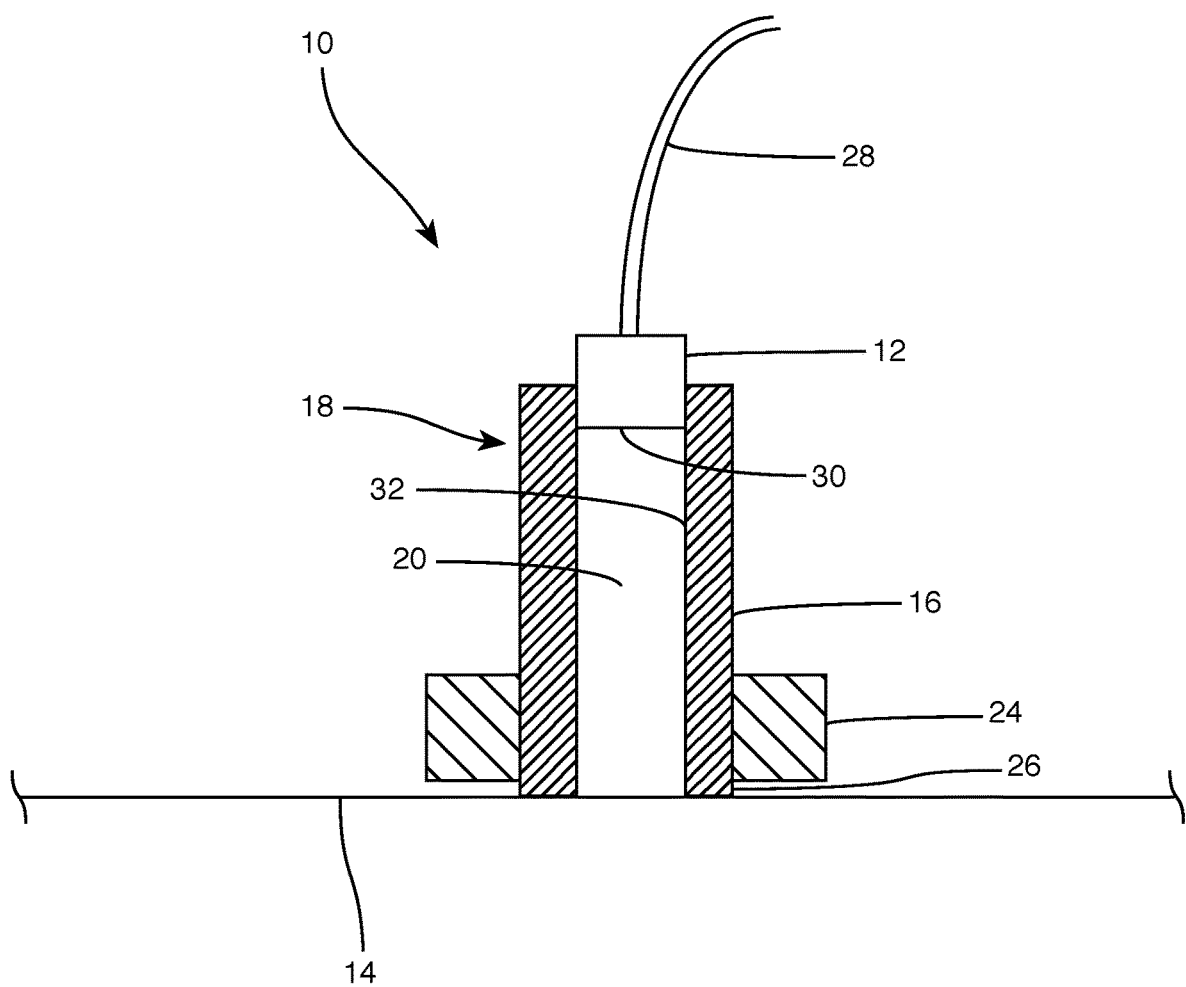
FIG. 5 shows a cross-sectional side view of a sensor device according to one embodiment of the present disclosure.
Figure 6:
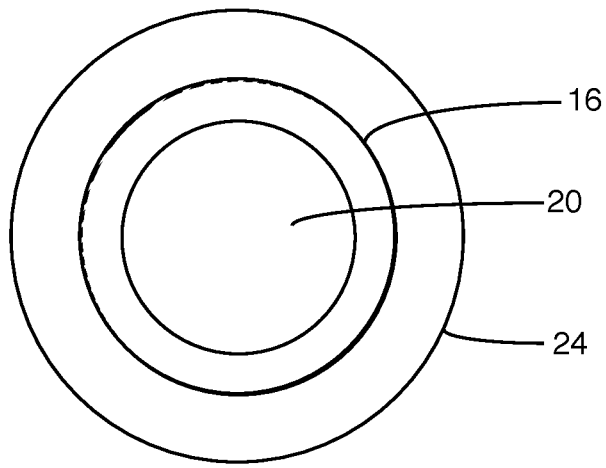
FIG. 6 shows a cross-sectional lengthwise view along line A-A of FIG. 1 according to one embodiment of the present disclosure.

FIGS. 1, 2, and 5 show multiple embodiments of a sensor device 10 having a sensor 12 that is in sensory contact with a surface 14 of an object of interest. The sensor 12 is mounted to a probe body 16 at a second end 18 of the probe body 16. The probe body 16 defines a probe cavity 20 enclosed within the probe body 16 extending from a first end 22 of the probe body 16 to the second end 18 of the probe body 16 adjacent the sensor 12. The sensor device 10 is removably attached to the surface 14 with a magnet 24 located adjacent the first end 22 of the probe body 16. FIGS. 1 and 2 show an isolating seal portion 26 located adjacent the first end 22 of the probe body 16 between the probe body 16 and the surface 14.

The sensor 12 shown in FIGS. 1, 2, and 5 is preferably an ultrasound or ultrasonic sensor for non-contact measurement of vibrations propagating from the surface of the object of interest. The object of interest is preferably a surface of a machine or other device that emits vibrations during operation. The sensor 12 may be selected from a number of known and available ultrasonic sensors that are configured to detect vibrations through a fluid medium, such as a gas or liquid medium. The sensor 12 detects vibration through the fluid medium and generates an output signal including data corresponding to vibrations detected by the sensor 12. The sensor 12 may be in electronic communication with an analyzer or computing device through a wire 28 for further processing of a signal outputted by the sensor 12. While the sensor 12 is preferably an ultrasound or ultrasonic sensor, it is also understood that the sensor may comprises any other suitable sensor for non-contact detection of vibrations propagating from a surface, such as a sensor including a membrane or other surface that vibrates when a propagated vibration contacts the surface.

The sensor 12 is located adjacent the first end 22 of the probe body 16. The sensor 12 includes a sensor surface 30 that is located within the probe body 16 in sensory communication with the probe cavity 20. The sensor 12 may be located at the second end 18 of the probe body 16 such that the sensor 12 is only partially located within the probe body 16, as shown. Alternatively, the sensor 12 may be positioned within the probe body 16 such that the sensor 12 is fully within the probe body 16. The sensor 12 and attached wire 28 may be enclosed or at least partially enclosed within a shrink wrap or other material at the second end 18 of the probe body 16 to further isolate the sensor 12 from an outside environment, to provide a mechanical strain relief, and to afford further protection and reliability enhancement to the sensor device 10.

Referring to FIG. 5, in one embodiment the probe body 16 is formed of an elongate cylindrical rubber tube. The probe body 16 extends through the magnet 24 to an end that is in contact with the surface 14 of the object of interest. The isolating boundary portion 26 is defined by a section of the tubing extending beyond the magnet 24 and to the surface 14. The magnet 24 is secured around the probe body 16 with a press-fit or interference engagement. The magnet 24 is secured around the probe body 16 such that a gap exists between a bottom edge of the magnet 24 and the surface The sensor 12 is secured within the probe body 16 at the second end 18 of the probe body. The probe body 16 is preferably formed of an elongate cylinder extending from the first end 22 to the second end 18. The probe body 16 may be open at both the first end 22 and the second end 18.

Referring to FIGS. 1, 2, and 5 to 8, the probe cavity 20 is enclosed within the probe body 16 and extends from a point adjacent the surface 14 to the sensor surface 30 of the sensor 12 shown in FIGS. 1, 2, and 5. The probe cavity 20 is defined by an inner wall 32 of the probe body 16. The inner wall 32 is preferably solid and the probe cavity 20 is isolated from an outside environment 33 by a thickness of walls of the probe body 16. The probe body 16 is preferably formed of a material that isolates the probe cavity 20 from exterior signals and noise sources. Vibrations from an area 35 within the surface 14 propagate through a gas or liquid medium confined within the probe cavity 20 and are directed towards the sensor surface 30. For example, the probe body 16 may be formed of a rubber or polymer material that is resiliently flexible and isolates vibrations occurring outside of the probe cavity 20 from vibrations in an environment surrounding the probe body 16. The probe body 16 supports the sensor 12 at the second end 18 of the probe body 16 and retains a shape of the probe cavity 20 when the sensor device 10 is mounted to the surface 14.

Figure 7:
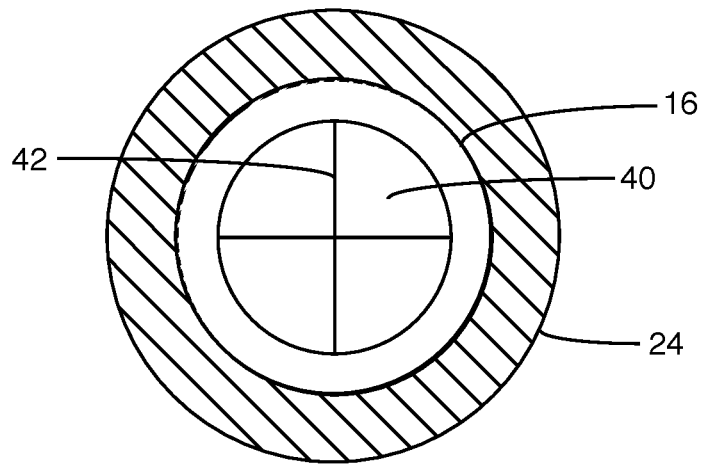
FIGS. 7 and 8 show a cross-sectional lengthwise view of a sensor device having a plurality of channels according to one embodiment of the present disclosure.
Figure 8:
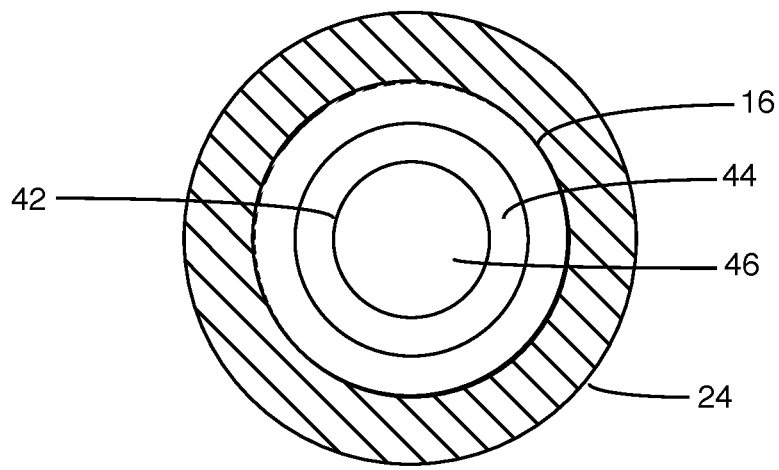

In one embodiment, a baffle within probe body 16 defines a plurality of isolated volumes or cavities within the probe body 16. For example, the probe body 16 may include multiple tube or channel baffles, wherein each of the multiple tubes or channels may segment portions of the surface 14 or with multiple surfaces. The multiple tubes or channels may pipe vibrations from the surface to a single sensor 12 to enable the sensor to detect vibrations from multiple portions of the surface 14. As shown in FIG. 7, in one embodiment the probe cavity 20 is divided into a plurality of channels 40 running along a length of the probe body 16 between the surface 14 and the sensor surface 30. The channels 40 may be formed in quadrants by locating a divider 42 within the probe cavity 20. In another embodiment, as shown in FIG. 8, the divider 42 may be formed of a tube located within the probe cavity 20, such that concentric tubular channel 46 and annular channel 44 are located within the probe cavity 20.

The magnet 24 shown in FIGS. 1 to 5 is preferably a permanent magnet, such as a rare-earth magnet, and is fixed to the probe body 16 adjacent the first end 22 of the probe body. The magnet 24 is preferably cylindrical in shape and includes an open inner portion. Referring to FIG. 1, in one embodiment the magnet 24 is fixed adjacent the first end 22 of the probe body 16 such that the open inner portion of the magnet 24 is aligned with the probe cavity 20. The probe body 16 may be fixed to the magnet 24 such as with an adhesive. In the embodiment of FIG. 1, an inner wall 34 of the magnet 24 is aligned with the inner wall 32 of the probe body 16 and forms part of the probe cavity 20. Alternatively, as shown in FIG. 2, the open inner portion of the magnet 24 is sized to fit around the probe body 16 such that when the probe body 16 is fixed to the magnet 24 the probe body 16 extends through the open inner portion of the magnet 24. In the embodiment of FIG. 2, the magnet 24 may be chemically or mechanically secured to the probe body 16 such as by use of adhesive, fastener, press-fit or interference engagement between the magnet 24 and the probe body 16. The magnet 24 includes a lower surface 36 formed on the magnet 24 and oriented towards the surface 14.

Figure 3:
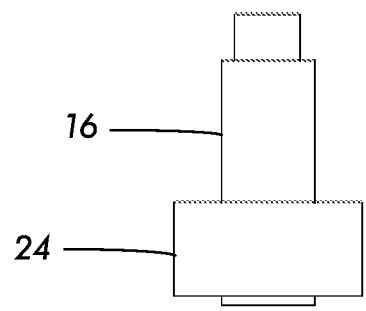
FIG. 3 shows a side view of a sensor device according to one embodiment of the present disclosure.
Figure 4:
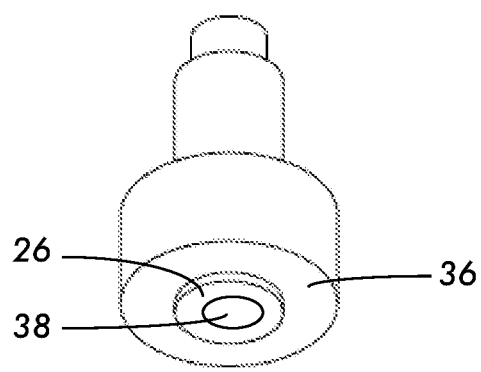
FIG. 4 shows a bottom view of a sensor device according to one embodiment of the present disclosure.

The isolating boundary portion 26 is located between the first end 22 of the probe body 16 and the surface 14 when the sensor device 10 is attached to an object of interest and a gap exists between the lower surface 36 of the magnet 24 and the surface 14. The isolating boundary portion 26 is preferably shaped such that a shape of the isolating boundary portion 26 matches a shape of the probe body 16 and magnet 24. For example, as shown in FIG. 3, the isolating boundary portion 26 is preferably formed as a ring having an opening 38 formed therein. The opening 38 is preferably aligned with the probe cavity 20. The isolating boundary portion 26 preferably fully circumscribes the opening 38 to substantially seal the probe cavity 20 against the surface 14.

The isolating boundary portion 26 is preferably formed of a material that creates a seal between the lower surface 36 of the magnet or the first end 22 of the probe body 16 and the surface 14. For example, the isolating boundary portion 26 may be formed of a foam, flexible polymer, rubber, or other elastomeric materials that are capable of compressing between the surface 14 and the magnet 24 to seal the probe cavity 20 from an external environment. As shown in FIG. 1, the isolating boundary portion 26 may be fixed to the lower surface 36 of the magnet 24, such as with an adhesive. Alternatively, and as shown in FIG. 2, the isolating boundary portion 26 may be fixed adjacent the first end 22 of the probe body 16.

The probe body 16 and isolating boundary portion 26 together isolate the probe cavity 20 and sensor surface 30 to confine sensory measurement of airborne vibrations from the surface 14 within the probe cavity 20 and to the sensor surface 30 of the sensor 12. Vibrations propagating from the surface 14 are channeled within the probe cavity 20 such that the vibrations reach the sensor surface 30 with reduced interference or noise from external sources, thereby increasing a signal to noise ratio of the sensor device 10. The sensor device 10 allows relatively weak vibrations on the surface 14 to be detected by the sensor 12 without the sensor being overwhelmed by stronger external vibrations. When magnetically attached to surface 14, the structure of sensor device 10 provides effective isolation from ambient airborne vibration leakage into the probe cavity; and it isolates surface 14 vibrations X and Y plane of surface 14, while isolating and damping mechanically transmitted vibrations in a direction orthogonal to the surface 14 (along a Z axis). As a result of these things, the sensor 12 of sensor device 10 remains in an effectively inertial frame, not rattled by undesirable airborne and mechanical insults from the external environment and from the machine associated with surface 14. The probe body 16 confines an ultrasonic transfer medium, such as a gas (preferably air) or an incompressible liquid inside the probe cavity 20 which effectively couples the orthogonal periodic vibration motions of surface 14 with one or more airborne or fluidborne sensory detector elements within sensor 12. In one embodiment, the coupling medium between surface 14 and surface 30 within probe cavity 20 may an incompressible liquid, or a bladder containing an incompressible liquid such as water.

The sensor device 10 advantageously provides for the isolation of at least a portion of unwanted fluidborne vibrations from vibrations detected by the sensor device 10 while further making the sensor device 10 readily adaptable for installation on a variety of surfaces. The sensor device 10 further provides for consistent boundary definition for a vibrating surface area, isolation of cell volume, and position of the sensor 12 relative to the surface 14.

The probe body 16 effectively isolates unwanted mechanical, airborne, liquid borne vibration energy, such as from the outside environment 33. Isolation is typically by use of such as by absorbing, reflecting, attenuating, and filtering. Preferred embodiments are intended to isolate and exclude a broad range of fluid borne vibration from entering the probe body; and these preferred embodiments furthermore attenuate and damp out structurally transmitted mechanical vibrations originating from surface 14. For example ultrasonic energy is damped by the probe body 16 that is preferably formed of an elastomeric or other like material capable of absorbing ultrasonic energy, thereby reducing an amount of ultrasonic frequency range energy from the outside environment and from surface 14 that reaches the sensor surface 30. The orientation of the sensor surface 30 with respect to surface 14 and the probe cavity 20 confines axial vibrations from the surface 14 and provides shallow angle reflection of axial ultrasonic vibrations to increase an intensity of vibrations at the sensor surface 30. A shape of the probe cavity 20 may vary depending on desired sensory response characteristics. For example, in some instances a shorter and wider probe body 16 and corresponding probe cavity 20 may be desired, while a longer and narrower cavity 20 as shown in the figures is preferred.

The sensor device 10 may be formed of various materials depending on a desired frequency band for detection by the sensor device. For example, the sensor device may be formed of materials to isolate and confine a desired frequency band while excluding or reducing unwanted frequency ranges from the sensor device 10. In one embodiment, ratio compensation may be performed on measurements from the sensor device 10 using two or more isolated measurements detected by the sensor device 10, or by detecting an external and non-isolated measurement proximal to the sensor device 10.

In operation, an operator determines a circumscribed area of an area of interest for detecting vibrations from the area of interest. The operator orients the sensor device 10 such that the magnet 24 and isolating boundary portion 26 are located adjacent to the surface 14 of the area of interest. The magnet 24 pulls the sensor device 10 against the surface 14 and thereby substantially compresses the isolating boundary portion 26 between the surface 14 and the magnet 24. The compressed isolating boundary portion 26 creates a seal between the sensor device 10 and the surface 14, such that the probe cavity 20 is substantially isolated from an external environment. Fluidborne vibrations propagating from the surface 14 are coupled with sensor surface 30 through the gas or liquid vibration transmission medium within the probe cavity 20, while mechanical vibrations that travel along a length of the probe body 16 are attenuated to have negligible effect on 20. The sensor surface 30 is stimulated by these coupled vibrations such that the sensor 12 detects coupled fluidborne vibrations propagating from the surface 14.

When an operator desires to remove the sensor device 10 from the surface 14, the operator lifts the sensor device 10 until a force of the operator lifting the sensor device 10 exceeds a force of the magnet 24 securing the sensor device to the surface 14.

Figure 9C:
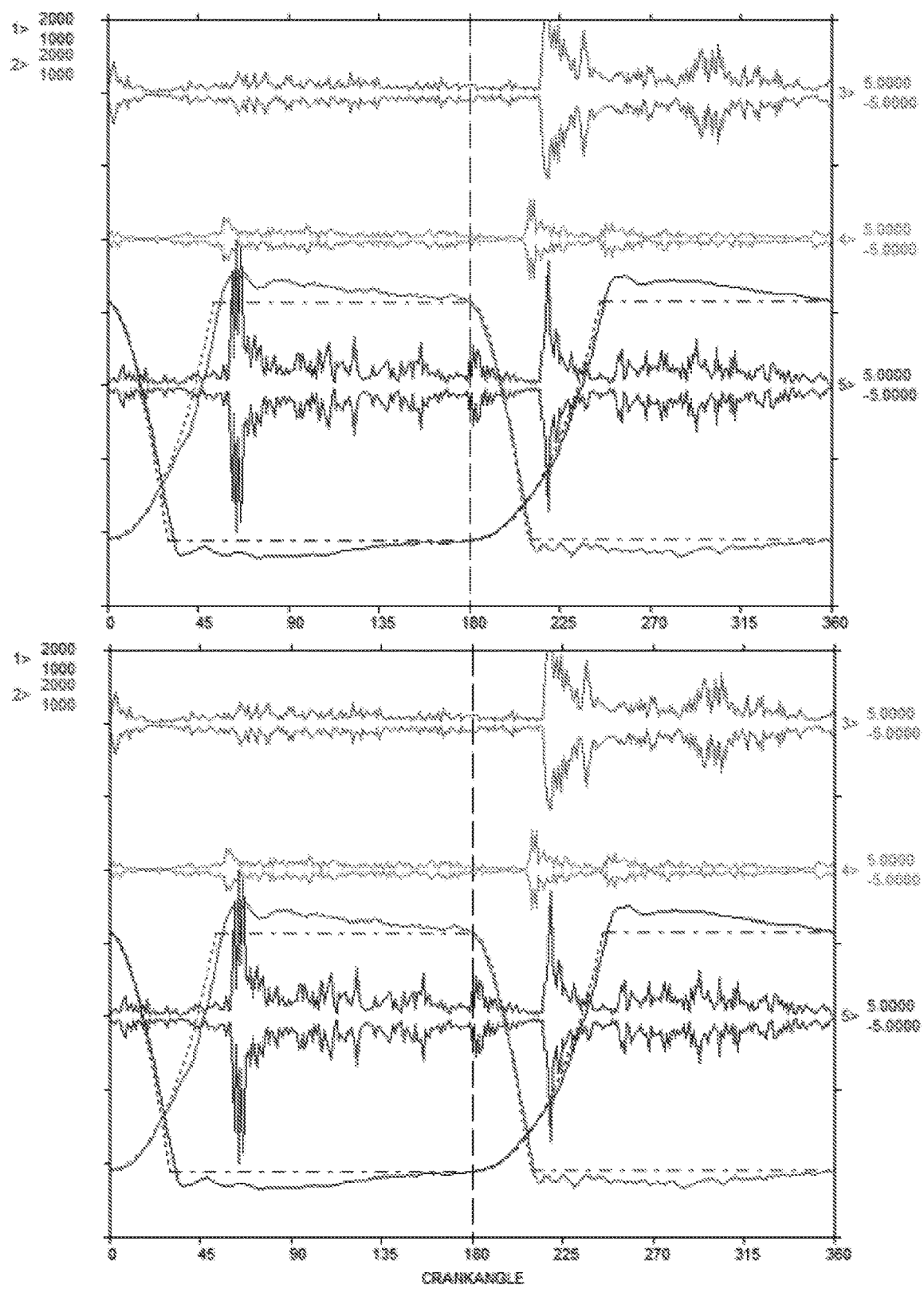

A preferred embodiment applies an ultrasonic sensor device for removable attachment to a gas compressor for measurement of mechanical defects, normal operation, normal processing, abnormal operation, and abnormal processing. Three examples are provided showing ultrasonic signal waveforms comparing normal operation and processing with abnormal conditions. Referring to FIGS. 9A, 9B, and 9C, where examples 1, 2, and 3 correspond respectively to a ring leakage, a discharge leakage, and plugged valve respectively. Each figure compares normal and problematic ultrasonic waveforms; one may interpret these compared differences to likely consequence for the cited mechanical defect. FIG. 9A shows problematic ring leakage from ~30 to ~150 degrees and from approximately ~225 to ~340 degrees. FIG. 9B shows problematic discharge leakage from ~10 to ~30, from ~μ60 to ~80, and from ~225 to ~360 degrees. FIG. 9C several ultrasonic waveform plots together with traditional pressure waveform plots showing the effects of a worn rider leading to a plugged valve. It is common practice to use ultrasonic airborne vibration measurements to supplement other vibration and pressure condition monitoring information. Passive ultrasonic measurements like these measured using a removable attachment are preferred for many reasons such as: the removable attachment of the sensor device is not intrusive, the quick connect and quick disconnect easy easily performed, the isolation and insulation essentially eliminate unwanted noise from reaching the sensor element, the compliance and attenuation of the probe body provide a very effective ultrasonic vibration signal collection cavity and effectively eliminate most of the unwanted low frequency mechanical vibration. The ultrasonic probe sensor device allows meaningful primary and supplemental measured data to be interpreted along-side normal vibration and pressure plots, the collection of which are typically aligned with regard to rotation angle.

A sensor device used to collect P-V (pressure vs. volume) pressure plots can be more intrusive and thereby less desirable than the sensor device used to collect these ultrasonic waveforms; and, as one can determine from study of FIG. 9C, crank angles for changes in pressure plot are often distinguishable in the ultrasonic waveform plot as well. Therefore it is advantageous for an ultrasonic sensor device having quick and easy attachment, connection, and disconnection by itself or in conjunction with pressure and vibration measurement probes.

Magnet mounting is a preferred for removable attachment whereby the sensor device is securely attached and sealed onto a portion of interest of a surface on an object of interest thereby creating a probe cavity filled with coupling fluid such as air or liquid. Alternate embodiments may employ an alternate technique for securely and removably attaching and sealing the sensor device to the object of interest. Because the sensor device may be mounted vertically (up or down), horizontally, and at other geometric angles compared with gravity, a preferred measure for secure attachment is sufficient to hold strong with at least one unit of gravitational acceleration. Examples of alternate force restraints to achieve secure and removable attachment and sealing may include fastener, clamp, strap, clip, removable adhesive, pressure, and vacuum.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A sensor device for being removably attached to a ferromagnetic surface of an object of interest, the sensor device comprising:
    a probe body having a first end supporting a sensor and a second end for being removably attached to the ferromagnetic surface, the probe body defining a probe cavity containing a vibration coupling fluid medium within the probe body;
    a sensor located at the first end of the probe body, isolated from unwanted mechanical vibrations originating from the ferromagnetic surface and isolated from unwanted fluidborne vibrations originating from the environment around the probe body when the probe body is attached to the ferromagnetic surface;
    an attachment element comprising a permanent magnet located adjacent the second end of the probe body and at least partially circumscribing one of the probe body and probe cavity;
    a sealing boundary portion located between the permanent magnet and a surface of the object of interest and in communication with the probe cavity defined within the probe body;
    wherein the sealing boundary portion is compressibly sealed by the magnet's force against the ferromagnetic surface such that the sealing boundary portion is compressed between the permanent magnet and the ferromagnetic surface and such that a gap is created between a bottom edge of the attachment element and the ferromagnetic surface when the sensor device is mounted on the ferromagnetic surface; and
    wherein the coupling medium transmits fluidborne vibration signals from the vibrating object of interest having the ferromagnetic surface at the second end of the sensor device for the sensor to detect coupled vibrations at first end of the sensor device.

2. The sensor device of claim 1, wherein the sensor comprises an ultrasound sensor located at or within the probe cavity defined within the probe body.

3. The sensor device of claim 1, wherein the permanent magnet is tubular in shape including a passage formed therethrough, the probe cavity further comprising the passage formed through the permanent magnet.

4. The sensor device of claim 3, wherein the tubular permanent magnet fully circumscribes the probe body and cavity defined therein.

5. The sensor device of claim 1, wherein the isolating boundary portion is formed of an elastomeric material.

6. The sensor device of claim 1, wherein the sensor is fully enclosed within the probe body.

7. The sensor device of claim 1, wherein a wall of the cavity is formed from a rubber material for further isolating external vibrations from the cavity.

8. The sensor device of claim 1, wherein the isolating boundary portion is formed into a ring having an open inner portion having a shape corresponding to a shape of the cavity formed within the probe body.

9. The sensor device of claim 1, wherein the permanent magnet has an open inner portion that is located around an outer surface of the probe body, and wherein the probe body extends through the permanent magnet to a point adjacent a bottom surface of the permanent magnet.

10. The sensor device of claim 1, wherein an inner wall of the probe body defining the probe cavity is aligned with the passage of the isolating boundary portion such that a cavity having a consistent width is formed along a length of the cavity.

11. The sensor device of claim 1, wherein the isolating boundary portion is fixed to a bottom surface of the magnet such that the isolating boundary surface is located between the magnet and the surface of the object of interest.

12. The sensor device of claim 1, wherein the probe body comprising an elongate cylindrical tube extending through the magnet, wherein the isolating boundary portion comprises a portion of the cylindrical tube that extends beyond the magnet to the surface.

13. The sensor device of claim 1, further comprising a divider located within the probe cavity for forming a plurality of channels within the probe cavity.

14. The sensor device of claim 13, wherein the channels are formed as quadrants within the probe cavity.

15. The sensor device of claim 13, wherein the divider is a tube creating concentric channels within the probe cavity.

16. A sensor device for being removably attached to an object of interest, the sensor module comprising:
   a probe body having a first end and a second end, the probe body defining a cylindrical probe cavity within the probe body;
   an ultrasonic sensor located at the first end of the probe body, the sensor having a sensor surface in sensory communication with the probe cavity defined within the probe body;
   an attachment element comprising a permanent magnet located adjacent the second end of the probe body and at least partially circumscribing the probe cavity defined within the probe body;
   an elastomeric isolating boundary portion located between the permanent magnet and a surface of the object of interest and having a passage formed therethrough, the passage in communication with the probe cavity defined within the probe body;
   wherein the elastomeric isolating boundary portion is compressed by the permanent magnet between the permanent magnet and the surface of the object of interest when the sensor module is attached to the object of interest such that a gap is created between a bottom edge of the attachment element and the ferromagnetic surface when the sensor device is mounted on the ferromagnetic surface to at least partially isolate vibrations of the object of interest from the sensor module.

17. An ultrasonic sensor device for being removably attached to an ultrasonically vibrating surface of an object of interest, the device comprising:
   a probe body, a sensor, and a secure attachment mechanism; wherein
      the probe body includes the secure attachment mechanism to secure and allow removal of the probe body from a portion of an object of interest;
      the sensor having a detector and electrical output and including
         an ultrasonic vibration sensing surface responsive to vibration energy fluid coupled through a medium, and
         an electrical output signal derived from ultrasonic vibration energy detected by the sensing surface;
      the secure attachment mechanism for removable attachment of a free standing probe body;
      a sealing boundary portion located between the secure attachment mechanism and the ultrasonically vibrating surface of the object of interest;
         wherein secure attachment is at least sufficient to overcome gravitational acceleration for a probe body attached to a vertical surface and to compressibly seal the sealing boundary portion between the secure attachment mechanism and the ultrasonically vibrating surface of the object of interest such that a gap is created between the secure attachment mechanism and a surface of the object of interest when the sensor device is mounted on the surface of the object of interest;
   the device with the probe body attached to the vibrating surface further comprises a confinement boundary, a structure, a material, and an exclusion boundary; wherein
      the confinement boundary of the probe body comprises a volume of fluid medium for coupling ultrasonic vibrations from a surface of interest to the sensor surface,
      the structure of the probe body stations the sensor surface near a first end of the confined volume,
      the material of the probe body attenuates mechanically transmitted ultrasonic vibrations, and
      the exclusion boundaries of the probe body attenuate external vibratory noise.

18. The ultrasonic sensor device of claim 17 wherein the attachment mechanism is a permanent magnet, wherein the attenuating material is an elastomer, and where the coupling medium is selected from the group consisting of air, gas, and water.

19. The ultrasonic sensor device of claim 18 where the object of interest is a valve cover for a gas compressor and where the ultrasonic vibrations further comprise a characteristic pattern which may deductively associated with a recognizable pattern from the group consisting of recognizable patterns including: an intake, and exhaust, an open condition, a closed condition, a timing, an impact, an operation, a start, an on line, and an off line.

* * * * *